3,387,894
WHEEL STRUCTURES
Leonard Louik, c/o Care Plastic Sales, Inc., 201 Penn Center Blvd., Pittsburgh, Pa. 15235
Filed June 13, 1966, Ser. No. 557,136
8 Claims. (Cl. 301—63)

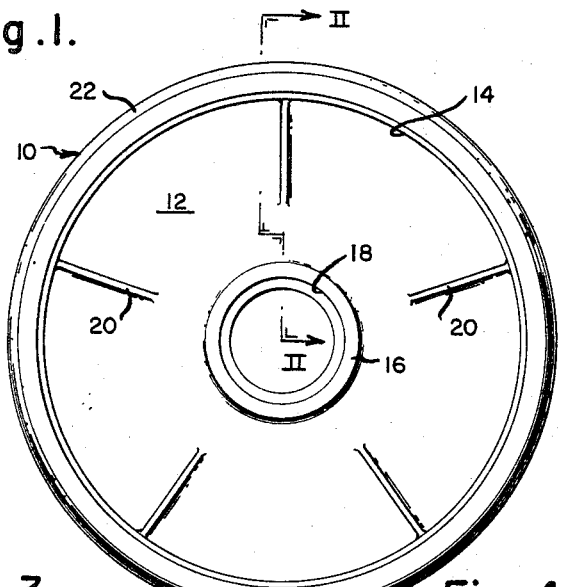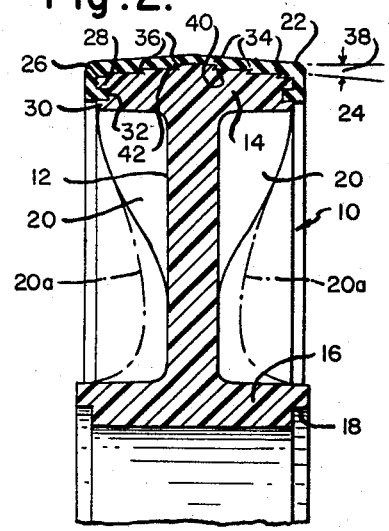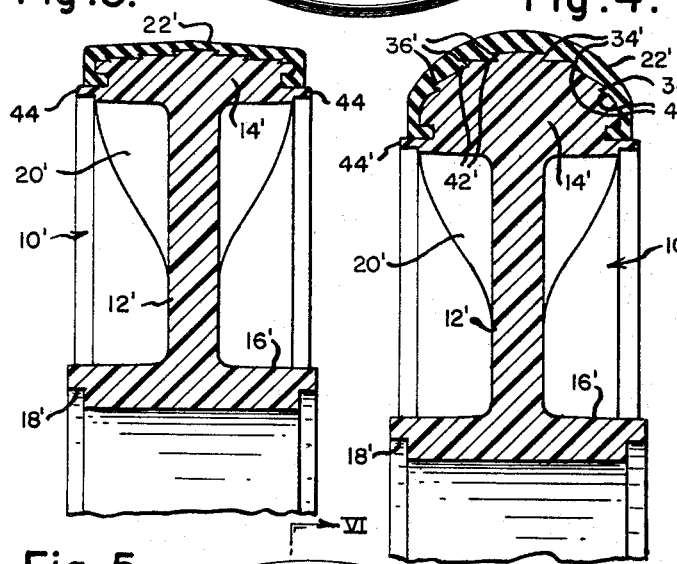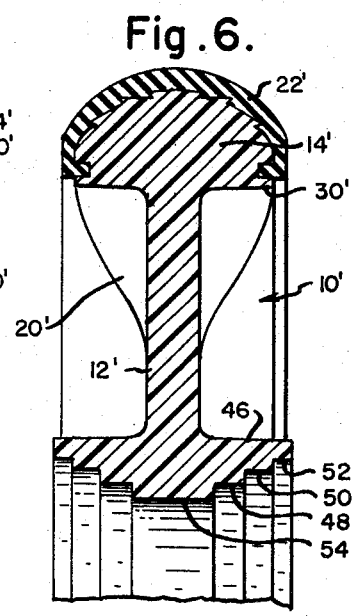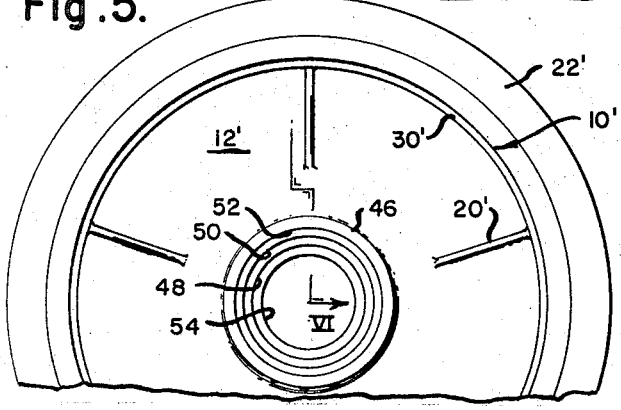
INVENTOR
Leonard Louik

ABSTRACT OF THE DISCLOSURE

A wheel structure is disclosed suitable for various types of carts and vehicles. The wheel structure utilizes a minimum of component parts, which can be molded from plastic or other structural material. Novel means are disclosed for securing a tire to the wheel rim and for protecting the lateral surfaces of the tire. In one embodiment of the invention, the wheel hub is formed with an inward stepped configuration to accommodate differing sizes of bearings and/or hub caps.

---

The present invention relates to novel and efficient wheel structures, and more particularly to a relatively light weight but structurally strong wheel structure which can be molded, cast or otherwise formed from readily available plastic and other structural materials.

There is considerable demand at the present time for wheels of various shapes and sizes which can be quickly and inexpensively produced for grocery carts, large and small toy vehicles, picnic and golf carts, and the like. For many of these applications it has been necessary to fabricate the wheels from metallic or other expensive fabricational materials in order to obtain requisite structural strength. Even then structural rigidity has frequently been sacrificed in attempts to conserve such materials. In those which have been fabricated for such applications from non-metallic or conventional plastic structural materials, damage or destruction frequently occurred owing to the lack of adequate reinforcing means for the wheel structures.

In known types of wheel structures which have been developed for the aforementioned applications, and which are usually provided with tires of various types, there have been no adequate means provided for quickly mounting the tire on the wheel during the manufacture of tthe wheel structure or for easily removing the tire for repair or replacement. In most cases, particularly in the more inexpensive wheel structures of the class described, it was virtually impossible to remove the tire for replacement, which necessitated premature disposal of the wheel structure.

This particularly is the case with reference to the aforementioned grocery carts, whose wheel structures are subject to extensive and continuous wear. Such wheel structures usually are provided with an elastomeric tire fabricated from natural or a suitable synthetic rubber. Conventional wheel structures for this purpose, have been subject to uneven wear at the tire surfaces owing to the normal abuse to which the carts are subjected and particularly to the structural characteristics of known forms of wheels. Thereafter such wheels cause wobbling and other customer annoyances. The tires, however, in addition to being relatively short-lived are also very difficult to remove from conventional wheels and to replace owing to the manner in which the tires are conventionally mounted on the wheel structures.

These considerations apply to other wheeled vehicles, whether of the service or toy variety, depending upon the particular application of the vehicle and the amount of use or abuse to which it is normally subjected.

These problems and difficulties associated with prior wheel structures are overcome by the disclosed forms of the wheel structures of the invention, wherein they are provided in some or all forms of the invention, as the case may be, with novel means for reinforcing the structures, for retaining tires thereon for facilitating the removal of the tires for repair of replacement when necessary, and for supporting the tires on the wheel structure in a manner such that it is subject to even wearing regardless of the particular application of the wheel structures. In another feature of the invention, the hub portion of the wheel structure is adapted, in certain applications thereof, for use with a variety of differing bearing structures with a result that one form of wheel structure can be utilized for mounting on a number of differing vehicles.

Generally speaking, in prior or known wheel structures a different hub structure or arrangement for the wheel had to be provided depending upon the particular type and size of the wheel bearing provided for the vehicle. This necessitated the provision of additional molds or other fabricational devices in order to accommodate the differing forms of required hub structures.

This additional difficulty is overcome by one form of my novel wheel structure which provides a hub structure which can be used, within the physical size limitations of the hub structure, with a number of bearing arrangements of differing sizes or shapes. The latter feature of my invention correspondingly reduces the number of differing molds or other fabricating devices necessary for producing such wheel structures.

During the foregoing discussion certain objects, features and advantages of the invention have been alluded to. These and other objects, features and advantages of the invention will be elaborated upon during the forthcoming description of certain presently preferred embodiments of the invention, together with preferred methods of practicing the same.

In the accompanying drawings I have shown certain presently preferred embodiments of the invention and have illustrated certain methods of practicing the same, wherein:

FIGURE 1 is a side elevational view of one form of wheel structure arranged in accordance with my invention;

FIGURE 2 is an enlarged partial sectional view of the wheel structure as shown in FIGURE 1 and taken along reference line II—II thereof;

FIGURE 3 is a similarly sectioned view of another form of wheel structure made in accordance with my invention;

FIGURE 4 is a similarly sectioned view of still another form of wheel structure of the invention;

FIGURE 5 is a fragmentary side elevational view of yet another form of wheel structure of my invention; and FIGURE 6 is an enlarged partial sectional view of the wheel structure as shown in FIGURE 5 and taken along reference line VI—VI thereof.

Referring now more particularly to FIGURES 1 and 2 of the drawings, an exemplary form of the invention shown therein is directed to a wheel structure 10 having a relatively flat annular wheel disc 12 which is joined at its outer periphery to a rim or a tire support 14 and at its inner periphery to a hub portion 16. The hub portion 16 can be offset, as denoted by reference numeral 18, in order to accommodate a suitable bearing or wheel retainer disc (not shown). In this arrangement of the invention, the wheel disc 12, rim 14 and hub 16 can be molded or cast integrally from a suitable plastic or other structural material. It will be understood, however, that the aforementioned components can be fabricated separately and joined together by suitable means, in keeping with the spirit of my invention.

For structural strength the rim 14 is further reinforced by the wheel disc 12 by means of a plurality of radially extending ribs or gussets 20. The ribs radially engage the wheel disc 12 and engage the inner periphery of the rim 14, in this example. As illustrated in the drawings five such ribs 20 are employed in this example of the invention, although it will be obvious that a greater or lesser number of such ribs can be utilized depending upon the particular application of the invention and the amount of structural rigidity required.

If required in certain applications of the wheel structure 10, the ribs 20 also can be extended entirely across the wheel disc 12 to its inner periphery or they can be further extended for transversely extending with the junction hub portion 16 in order to provide reinforcement for the latter, also. Such alternate rib structure is denoted in FIGURE 2 by chain outline 20a thereof.

Mounted substantially upon the entire outer surfaces of the rim 14 is a tire 22, desirably fabricated from a suitable elastomer such as polyurethane. In a preferred form of the invention the tire 22 is sufficiently resilient or elastic to permit assembly on or removal from the rim 14 without the use of undue effort or special tools. It is also contemplated that the tire and wheel can be integrally molded. A substantially flat tire 22, as shown in FIGURES 1–3, is adaptable, for example for use on relatively soft surfaces such as lawns or carpeting.

In this arrangement of the invention tire 22 is provided along each lateral edge thereof with an inwardly and laterally extending lip 24 which defines an adjacent recess or groove 26. Similarly each lateral edge of the rim 14 is provided with outwardly and laterally extending lips 28 and 30 which define therebetween a recess 32. In this arrangement of the invention the rim lip and recess, 28, 32 are respectively interfitted with the tire lip and recess 24–26 to retain the tire on the rim. The lateral and opposite extension of adjacent rim and tire lips securely holds the tire on the rim under conditions of severe usage, such as encountered by grocery carts and the like, but permits removal and replacement of the tire without the use of specialized tools.

The rim 14 is provided with additional retaining means for the tire 22. In accordance with the latter feature of the invention the rim 14 is provided with a plurality of circumferentially extending spaced ridges 34 and 36. Desirably, each group of ridges 34 and 36 are angled away from the other group and toward the adjacent lateral edge of the rim 14. Desirably, the ridges 34 are arranged with respect to the ridges 36 with respect to an imaginary plane passing centrally through the rim 14. In this example the rim is beveled to some extent on each side of its center line as denoted by arrows 38. The tire 22 is more or less stretched over the ridges 34 and 36, and the latter tend to embed themselves into the elastomeric material from which the tire 22 is formed. Alternatively, the tire 22 can be provided with complementarily formed ridges 40 and 42, with the latter ridges being directed generally toward one another, to engage respectively and complementarily with the rim 36. The interfitting rim and tire ridge arrangement ensures retention of the tire 22 on the rim 14 during normal use of the wheel structure. However, tire 22 can be readily removed by unseating one of its lips 24 followed by peeling the lateral edge of the tire back over the rim 14. In operation, with the tire 22 being thus secured at a number of laterally displaced areas, the tire is prevented from shifting relative to the rim 14 during use and thus uneven wear of the tire is prevented.

Referring now to FIGURE 3 of the drawings a generally similar arrangement of the wheel structure is illustrated. The rim 14' of the wheel structure, however, differs in that inner lip 44 at each lateral edge of the rim is extended outwardly of the tire 22' in order to afford protection to the sidewall thereof from scuffing or scraping by contact with store or home furnishings, tree trunks, and other obstacles, depending upon the application of the invention.

With reference now to FIGURE 4 of the drawings another arrangement of the wheel structure is illustrated. The latter arrangement of the invention is generally similar to that of FIGURE 3. However, the outer surface or tire engaging periphery of rim 14' of FIGURE 4 is domed or rounded in order to induce a similar shape in the tire 22', or alternatively to accommodate the rim 14' to a tire 22' which initially is so shaped. The domed structure of the rim 14' also enhances the engagement between the ridges 34'–36' of the rim 14' with the adjacent surfaces of the tire 22', or with the complementarily shaped ridges 40'–42' thereof when so provided. The domed structure of the tire and rim of FIGURE 4 in addition reduces the frictional engagement of the wheel structure with the floor or other hard surface, particularly when the vehicle is moved around turns. This feature is of special importance in grocery cart applications and in other vehicles which are intended primarily for use on hard surfaces, as it promotes further even tire wear and prolongs the life of the tire 22'.

With reference now to FIGURES 5 and 6 of the drawings another feature of my invention is illustrated wherein hub portion 46 of the wheel structure 10' is adapted for use with a number of differently sized bearing arrangements and/or hub caps. In furtherance of this purpose the hub portion 46 is made relatively thicker, in the radial direction, in comparison to the hubs 16 or 16' of the preceding figures. The inner periphery of the hub 46 is provided with a plurality of stepped or offset bearing surfaces, with three such surfaces, 48, 50 and 52 being here utilized. With this arrangement, bearings and/or hub caps of differing outer diameters can be selectively engaged by an appropriate one of the surfaces 48, 50 and 52. In addition, the inmost inner peripheral surface 54 of the hub 46 can be utilized to engage yet another, smaller bearing arrangement. Alternatively one pair of the bearing surfaces 48 or 50 or the single surface 54 can be utilized for mounting the wheel structure on a suitable bearing arrangement, while the outermost stepped surface 52 can be utilized for engagement with a wheel-retaining disc or a hub cap, which can be of a decorative character, if desired.

The wheel structure 10' of FIGURES 5 and 6 otherwise is generally similar to the domed wheel structure 10' of FIGURE 4 with the exception that the lateral tire engaging arrangement, particularly as exemplified in FIGURE 2, is utilized. It will be understood, of course, that the stepped hub structure 46 of FIGURES 5 and 6 can be utilized in connection with any of the preceding disclosed forms of the wheel structure. It will also be understood that the wheel reinforcing means or the hub structure 46, or both, can be employed with other suitable tire and tire securing arrangements and vice versa.

From the foregoing it will be apparent that novel and efficient forms of wheel structures have been disclosed herein. It will be understood, of course, that certain features of a given wheel structure can be utilized advantageously without the corresponding use of other features thereof. Accordingly, while I have shown and described certain presently preferred embodiments of the invention and have illustrated presently preferred methods of practicing the same, it is to be distinctly understood that the invention is not limited thereto but may be otherwise variously embodied and practiced within the scope of the following claims.

I claim:

1. A wheel structure comprising in combination an annular wheel disc, a generally tubular hub member extending transversely of said disc and joined to the inner periphery thereof, a rim member joined to the outer periphery of said disc, a plurality of radially extending reinforcing gussets joined to said wheel disc and to said rim member, a tire member substantially co-extending with the outer surface of said rim member, inter-fitting means on the lateral edges of said rim member and of said tire member for securing said tire member to said rim member, said rim member having a plurality of circumferentially extending spaced ridges on its outer surface, the ridges on one side of a central plane of said rim being angled generally away from its ridges on the other side of said plane, said ridges engaging the adjacent surfaces of said tire member to prevent shifting thereof on said rim, the outer surface of said rim being domed to facilitate engagement of said rim ridges with said tire, and said tire being stretched over said domed rim.

2. A wheel structure comprising in combination an annular wheel disc, a generally tubular hub member extending transversely of said disc and joined to the inner periphery thereof, a rim member joined to the outer periphery of said disc, a plurality of radially extending reinforcing gussets joined to said wheel disc and to said rim member, a tire member substantially co-extending with the outer surface of said rim member, interfitting means on the lateral edges of said rim member and of said tire member for securing said tire member to said rim member, said rim member having a plurality of circumferentially extending spaced ridges on its outer surface, the ridges on one side of a central plane of said rim being angled generally away from its ridges on the other side of said plane, said ridges engaging the adjacent surfaces of said tire member to prevent shifting thereof on said rim, the outer circumferential surface of said rim member being domed, and said tire member being complementarily domed for closely fitted engagement on said rim, the inner surface of said tire having a plurality of spaced circumferentially extending ridges, each of said ridges being shaped complementarily with an adjacent one of said rim ridges for inter-fitting engagement therewith to aid in retaining said tire member or said domed rim member.

3. A wheel structure comprising in combination an annular wheel disc, a generally tubular hub member extending transversely of said disc and joined to the inner periphery thereof, a rim member joined to the outer periphery of said disc, a plurality of radially extending reinforcing gussets joined to said wheel disc and to said rim member, a tire member substantially co-extending with the outer surfaces of said rim member, inter-fitting means on the lateral edges of said tire member and of said rim member for securing said tire member to said rim member, said inter-fitting means including adjacent tongue and groove structures formed on adjacent lateral edge portions of said rim member and of said tire member respectively, and a lip structure on each lateral edge of said rim member and extending outwardly of the adjacent lateral edge of said tire member for the protection of the same.

4. A wheel structure comprising in combination an annular wheel disc, a generally tubular hub member extending transversely of said disc and joined to the inner periphery thereof, a rim member joined to the outer periphery of said disc, a plurality of radially extending reinforcing gussets joined to said wheel disc and to said rim member, said hub member and said disc and said rim member being formed integrally, and said hub member being relatively thick in the radial direction and having on its inner periphery at least three axially extending stepped surfaces for accommodating wheel bearing means and hub caps of selectively different sizes.

5. A wheel structure comprising in combination an annular wheel disc, a generally tubular hub member extending transversely of said disc and joined to the inner periphery thereof, a rim member joined to the outer periphery of said disc, a tire member substantially co-extending with the outer surfaces of said rim member, inter-fitting means on the lateral edges of said tire member and on the lateral edges of said rim member for securing said tire member to said rim member, and a lip structure on each lateral edge of said rim member extending outwardly of the adjacent lateral edge of said tire for the protection of the same.

6. A wheel structure comprising in combination an annular wheel disc, a generally tubular hub member extending transversely of said disc and joined to the inner periphery thereof, a rim member joined to the outer periphery of said disc, a tire member substantially co-extending with the outer surfaces of said rim member, rectangular tongue and groove means on the lateral edges of said tire member and on the lateral edges of said rim member for securing said tire member to said rim member, said tongue and groove means being of stepped and of laterally extending and opposed configuration to prevent removal of said tire member from said rim member, said rim member being provided with a plurality of circumferentially extending spaced ridges on the outer surfaces thereof, the ridges on one side of a central plane of said rim member being angled generally away from those ridges on the other side of said plane, and said ridges engaging the adjacent surfaces of said tire member to prevent shifting thereof on said rim member.

7. The combination according to claim 6 wherein the outer surface of said rim is beveled circumferentially and toward said hub on each side of said plane to aid in at least partially embedding said ridges in the adjacent portions of said tire.

8. The combination according to claim 7 wherein said tire is provided with a like plurality of spaced circumferentially extending ridges, each of said tire ridges being shaped complementarily with the adjacent one of said rim ridges for interfitting engagement therewith.

References Cited
UNITED STATES PATENTS 2,955,884   10/1960   Marshall.

RICHARD J. JOHNSON, *Primary Examiner.*

UNITED STATES PATENT OFFICE
CERTIFICATE OF CORRECTION

Patent No. 3,387,894                                 June 11, 1968

Leonard Louik

It is certified that error appears in the above identified patent and that said Letters Patent are hereby corrected as shown below:

Column 6, list of References Cited, add the following references:

| | | | |
|---|---|---|---|
| 442,832 | 12/1890 | Sheridon | 152-380 |
| 1,386,389 | 8/1921 | Wilson | |
| 2,629,420 | 2/1953 | Walklet | 301-63X |
| 2,921,344 | 1/1960 | Carrico | 301-63X |
| 3,199,364 | 8/1965 | Dew | |

FOREIGN PATENTS

| | | |
|---|---|---|
| 1,225,376 | 2/1960 | France |
| 1,292,345 | 3/1962 | France |
| 708,889 | 5/1954 | Great Britain |
| 771,914 | 4/1957 | Great Britain |

Signed and sealed this 13th day of January 1970.

(SEAL)
Attest:

EDWARD M. FLETCHER, JR.                       WILLIAM E. SCHUYLER, JR.
Attesting Officer                                         Commissioner of Patents